(12) United States Patent
Chennupati et al.

(10) Patent No.: US 10,798,560 B2
(45) Date of Patent: Oct. 6, 2020

(54) ACCESSING A PRIVATELY HOSTED APPLICATION FROM A DEVICE CONNECTED TO A WIRELESS NETWORK

(71) Applicant: Tata Communications (UK) Limited, London (GB)

(72) Inventors: Ranjith Kumar Chennupati, London (GB); Stuart Mitchell, London (GB); Marc Schneider, London (GB); Eric Alistair Williams, Pembroke Pines, FL (US)

(73) Assignee: Tata Communications (UK) Limited, London (GB)

( * ) Notice: Subject to any disclaimer, the term of this patent is extended or adjusted under 35 U.S.C. 154(b) by 0 days.

(21) Appl. No.: 16/479,189

(22) PCT Filed: Jan. 24, 2018

(86) PCT No.: PCT/IB2018/050436
§ 371 (c)(1),
(2) Date: Jul. 18, 2019

(87) PCT Pub. No.: WO2018/138656
PCT Pub. Date: Aug. 2, 2018

(65) Prior Publication Data
US 2019/0387394 A1    Dec. 19, 2019

Related U.S. Application Data

(60) Provisional application No. 62/449,782, filed on Jan. 24, 2017.

(51) Int. Cl.
*H04W 8/20*        (2009.01)
*H04L 12/28*       (2006.01)
(Continued)

(52) U.S. Cl.
CPC ......... *H04W 8/205* (2013.01); *H04L 12/2898* (2013.01); *H04L 45/22* (2013.01);
(Continued)

(58) Field of Classification Search
CPC . H04L 45/22; H04L 63/0272; H04L 12/2898; H04W 12/00512; H04W 12/08;
(Continued)

(56) References Cited

U.S. PATENT DOCUMENTS

| | | | | |
|---|---|---|---|---|
| 9,015,809 | B2* | 4/2015 | Brown | H04W 12/02 726/4 |
| 2010/0330957 | A1* | 12/2010 | Harada | H04W 12/06 455/406 |

(Continued)

FOREIGN PATENT DOCUMENTS

| | | | |
|---|---|---|---|
| EP | 1826969 | A1 | 8/2007 |
| WO | 2012/037674 | A2 | 3/2012 |
| WO | 2016/073916 | A1 | 5/2016 |

OTHER PUBLICATIONS

"Class of Service", "Wikipedia", 2 pp., https://en.wikipedia.org/wiki/Class_of_service, Jul. 17, 2019.
(Continued)

*Primary Examiner* — Liton Miah
(74) *Attorney, Agent, or Firm* — Kaplan Breyer Schwarz, LLP

(57) ABSTRACT

A method and a system for determining a path of data traffic based on a destination Internet Protocol (IP) address, the destination IP address being either private or public and belonging to any one of multiple organizations. In the method and system, a subscribed device identifier and the destination IP address of one of the multiple organizations is received at a managed service platform. If both the subscribed device identifier and the destination IP address of the
(Continued)

one of the multiple organizations are not registered in a predetermined policy database, a subscriber or an owner of the subscribed device is prompted, at a telecommunications endpoint associated with the subscribed device identifier, to register the endpoint. The subscribed device identifier is then registered in the predetermined policy database, based on information received from the telecommunications endpoint in response to the prompting. If the subscribed device identifier and the destination IP address of the one of the multiple organizations are registered in the predetermined policy database, a service device of the managed service platform on a private network routes the data traffic to a private network resource of the one of the multiple organizations. If the subscribed device identifier is registered in the policy database and the destination IP address of the one of the multiple organizations is not registered in the predetermined policy database, the service device of the managed service platform on the private network routes the data traffic via an IP transit service to the public Internet.

22 Claims, 5 Drawing Sheets

(51) Int. Cl.
H04W 28/12 (2009.01)
H04W 88/04 (2009.01)
H04L 29/06 (2006.01)
H04L 12/707 (2013.01)

(52) U.S. Cl.
CPC ......... *H04L 63/0272* (2013.01); *H04W 28/12* (2013.01); *H04W 88/04* (2013.01)

(58) Field of Classification Search
CPC ..... H04W 60/00; H04W 28/12; H04W 88/04; H04W 8/205
See application file for complete search history.

(56) References Cited

U.S. PATENT DOCUMENTS

| | | | |
|---|---|---|---|
| 2012/0079122 A1* | 3/2012 | Brown | H04L 12/4641 709/227 |
| 2013/0054763 A1* | 2/2013 | Van der Merwe | H04L 63/0272 709/220 |
| 2014/0162684 A1* | 6/2014 | Shaw | H04W 4/029 455/456.1 |
| 2015/0139084 A1 | 5/2015 | Kaczmarska-Wojtania et al. | |
| 2016/0134616 A1* | 5/2016 | Koushik | H04L 63/08 726/9 |
| 2016/0134624 A1* | 5/2016 | Jacobson | H04L 63/168 726/4 |

OTHER PUBLICATIONS

Authorized Officer: Hultsch, Wolfgang, International Search Report and Written Opinion issued in PCT application No. PCT/IB2018/050436, dated Apr. 18, 2018, 13 pp.
Authorized Officer: Raposo Pires, Joao, International Search Report and Written Opinion issued in related PCT application No. PCT/IB2018/051011, dated May 29, 2018, 13 pp.

* cited by examiner

ACCESSING A PRIVATELY HOSTED APPLICATION FROM A DEVICE CONNECTED TO A WIRELESS NETWORK

RELATED APPLICATIONS

This application claims the benefit of U.S. Provisional Patent Application Ser. No. 62/449,782 filed Jan. 24, 2017, the entire disclosure of which is incorporated herein by reference.

FIELD

The present disclosure relates to telecommunications. In particular, the present disclosure relates to a system and method for securely accessing a privately hosted application or cloud application from a mobile network connected device using APN-based routing without the use of the public Internet or encryption.

BACKGROUND

Currently, there are well known and commonly used methods of securely accessing an organization's privately hosted or public cloud applications from the mobile device. "Privately hosted" in this context means that the host application cannot be accessed directly through the public Internet natively without the use of a Virtual Private Network (VPN) application, VPN setup on the device or VPN capabilities embedded within the application's client or VPN capabilities embedded as a part of a Mobile Device Management (MDM)/Enterprise Mobile Management (EMM) solution.

Some common methods are:
1. Virtual Private Network (VPN) setup directly on the device (available natively in the device network settings).
2. VPN setup utilizing a Mobile VPN client (e.g. Cisco Any Connect).
3. VPN capabilities integrated as a part of a Mobile Device Management (MDM) or Enterprise Mobile Management (EMM) software client setup on the device (e.g. IBM MaaS360). For web based apps, a web browser or the client app that has been previously integrated within the "container" of the MDM or EMM would need to be available as a part of this setup.
4. For secure connectivity to cloud applications and storage, the cloud providers allows for the capability of establishing a SSL or similar type of encrypted connection with the mobile device/client.
5. All the aforementioned methods include the availability of a valid public key infrastructure (PKI) setup that is extended to the mobile device in terms of valid (unexpired) private & public key certificates setup/install.
6. All these methods (i.e., methods 1 through 4) effectively ensure an encrypted or a virtual tunnel/path is created between the client and the host application as well as a public Internet connection must be available to the mobile device.
7. Alternatively, to the public Internet requirement is the capability to provide secure access over 3G/4G/LTE network but for only customers within their Mobile Network Operator's own private (e.g. MPLS) networks (such as services from AT&T and Verizon).

The prior-art solutions entail on-device software applications and/or valid (unexpired) PKI certificate installations on the mobile device in order to gain secure access to the organization's privately hosted or cloud-based applications. The current type of commonly used methods are suboptimal for users/mobile devices, leads to ongoing long-term costs of integration (for MDM/EMM deployments) and ultimately causes low mobile enterprise application adoption within organizations.

SUMMARY

The present disclosure is directed to a method and a system for determining a path of mobile data traffic based on a destination Internet Protocol (IP) address, the destination IP address being either private or public and belonging to any one of multiple organizations. In the method and system a subscribed device identifier and the destination IP address of one of the multiple organizations is received at a managed service platform. If both the subscribed device identifier and the destination IP address of the one of the multiple organizations are not registered in a predetermined policy database, a subscriber or an owner of the subscribed device is prompted, at a telecommunications endpoint associated with the subscribed device identifier, to register the telecommunications endpoint. The subscribed device identifier is then registered in the predetermined policy database, based on information received from the telecommunications endpoint in response to the prompting. If the subscribed device identifier and the destination IP address of the one of the multiple organizations are registered in the predetermined policy database, a service device of the managed service platform on a private network routes the data traffic to a private network resource of the one of the multiple organizations. If the subscribed device identifier is registered in the policy database and the destination IP address of the one of the multiple organizations is not registered in the predetermined policy database, the service device of the managed service platform on the private network routes the data traffic via an IP transit service to the public Internet.

In some embodiments, the service device of the managed service platform on the private network, interconnects directly with a mobile network operator (MNO) network, wherein the MNO network provisions a unique Access Point Name that is mapped to at least one interconnection point in the private network and is updated on each participating subscribed telecommunications endpoint.

In some embodiments, the private network resource is a wide-area network of the organization matching the destination IP address. In some embodiments, the service device of the managed service platform on the private network interconnects directly with the wide-area network.

In some embodiments, the private network resource is a cloud service provider platform of the organization matching the destination IP address. In some embodiments, the service device of the managed service platform on the private network interconnects directly with the cloud service provider platform.

In some embodiments, the service device of the managed service platform on the private network establishes public Internet connectivity via the IP transit service.

In some embodiments, if the destination IP address is registered, data traffic from a predetermined type of website routed to the destination IP address is blocked by the managed service platform.

In some embodiments, the interconnecting is performed, at least in part, via multiprotocol label switching.

BRIEF DESCRIPTION OF THE DRAWING

The present disclosure is best understood from the following detailed description when read in conjunction with the accompanying drawing Figures. Like numerals denote like features throughout the specification and the drawing Figures.

DETAILED DESCRIPTION

Figure 1A:
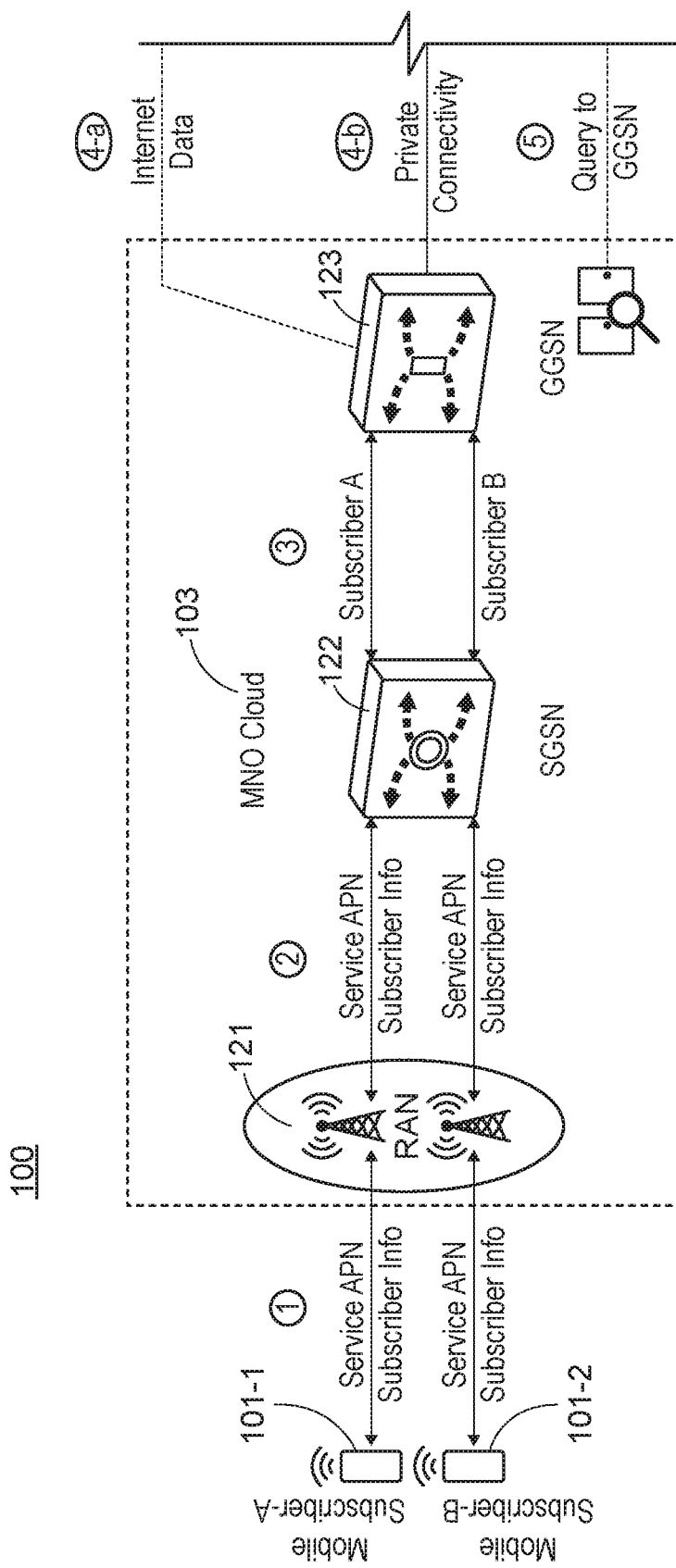
FIGS. 1A and 1B are a schematic functional diagram of a telecommunications system according to an illustrative embodiment of the present disclosure, which shows functions and interrelationships of the various elements of the system.

The present disclosure establishes a technological approach for securely accessing a privately hosted application or cloud application from a mobile network connected device using APN-based routing without the use of the public Internet or encryption.

The approach of the illustrative disclosure features a device and network agnostic solution where no on-device installations or setups are required, avoids the limitations of the current methods, and creates a seamless environment for the users' personal and work-related applications. This solution also covers any mobile connected device that requires a secure/lightweight method for data exchanges with privately hosted or cloud-based applications outside of the mobile network.

The solution relies in part on keeping track of both a unique identifier of each subscribed mobile device (i.e. any device that has a mobile SIM card or similar mobile cards or using the mobile network for data exchanges) and an organization's destination network IP address, and routing all data traffic initially through a service device of the illustrative embodiment before either routing it into a private network (i.e., an organization's enterprise network) or out to the public Internet. The solution is based in part on the recognition by the inventors of a shortcoming in the prior art, in that the information passed into the public Internet from a mobile network operator (MNO) network cannot be used to identify the originating endpoint. For example, the MAC address received in a data packet from the Gateway GPRS Support Node (GGSN), or the Packet Data Network Gateway (PGW), of an MNO network cannot be used to identify the originating endpoint because that MAC address is actually that of the GGSN or PGW by the time the packet gets passed out of the MNO network. As another example, once a given data session closes, the originating IP address changes, on a session-by-session basis; consequently, the originating IP in a data packet also cannot be relied upon to identify the subscribed device.

In conceiving of the solution, the inventors further recognized that the Serving GPRS Support Node (SGSN), or the Service Gateway (SGW), and GGSN, or PGW, in an MNO network do, in fact, have access to a unique identifier of the originating endpoint—even though that unique identifier is not accessible to any network operator on the IP transit side (e.g., the public Internet) because the identifier is not passed along in a conventional TCP/IP packet. Consequently, there is no way for any device on the public Internet to uniquely identify any mobile endpoint. Normally, this does not pose a problem with purely public Internet traffic. However, this is a problem when the same originating endpoint is capable of originating both public Internet and private network traffic, as the inventors recognized.

Some approaches in the prior art have attempted to use the public Internet to accommodate the accessing of private network data. A VPN-based solution, as disclosed in the Background section above, is one such approach. However, a VPN does not work well in situations where the mobile user sometimes wants to gain access to their enterprise network, but alternates between accessing the enterprise network and accessing websites in the public Internet (e.g., Facebook™, YouTube™, etc.) through apps dedicated to those websites.

Lastly, the inventors recognized that the approach to providing concurrent access from a registered subscribed device to both private and public network IP addresses should involve the routing of all traffic from the MNO network into a service device of the illustrative embodiment, based on the registered subscribed device having originated the traffic, and then routing the traffic accordingly according to destination address—that is, an address in the public Internet or belonging to the private network of the organization identified to be associated with the subscribed device. Among other advantages, the solution disclosed herein does not require a VPN. In addition, a subscriber's own personal apps (e.g., Facebook™, YouTube™, etc.) installed on the subscribed device will work, as they presumably will be routed to the public Internet.

Figure 1B:
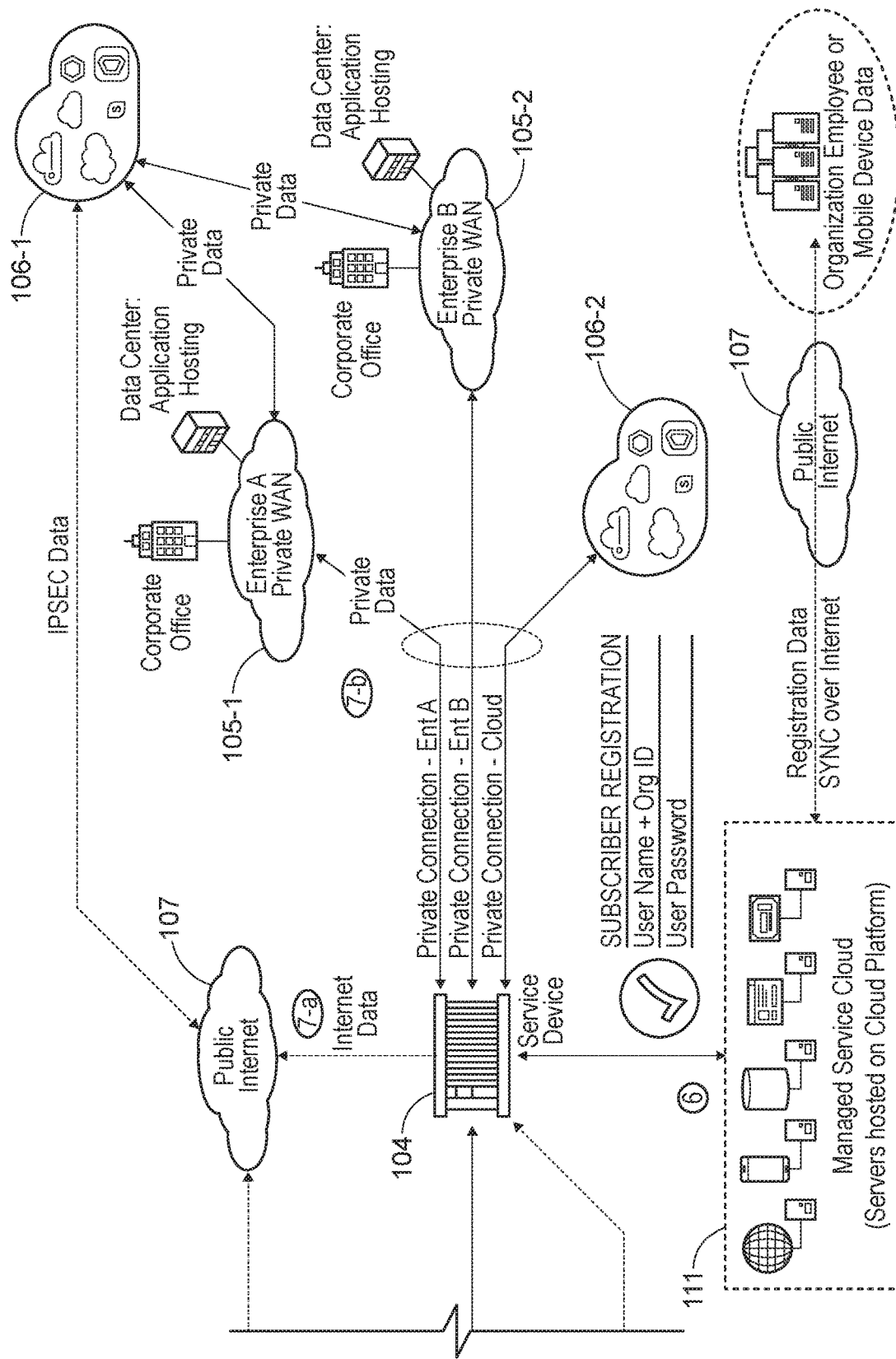
Figure 2:
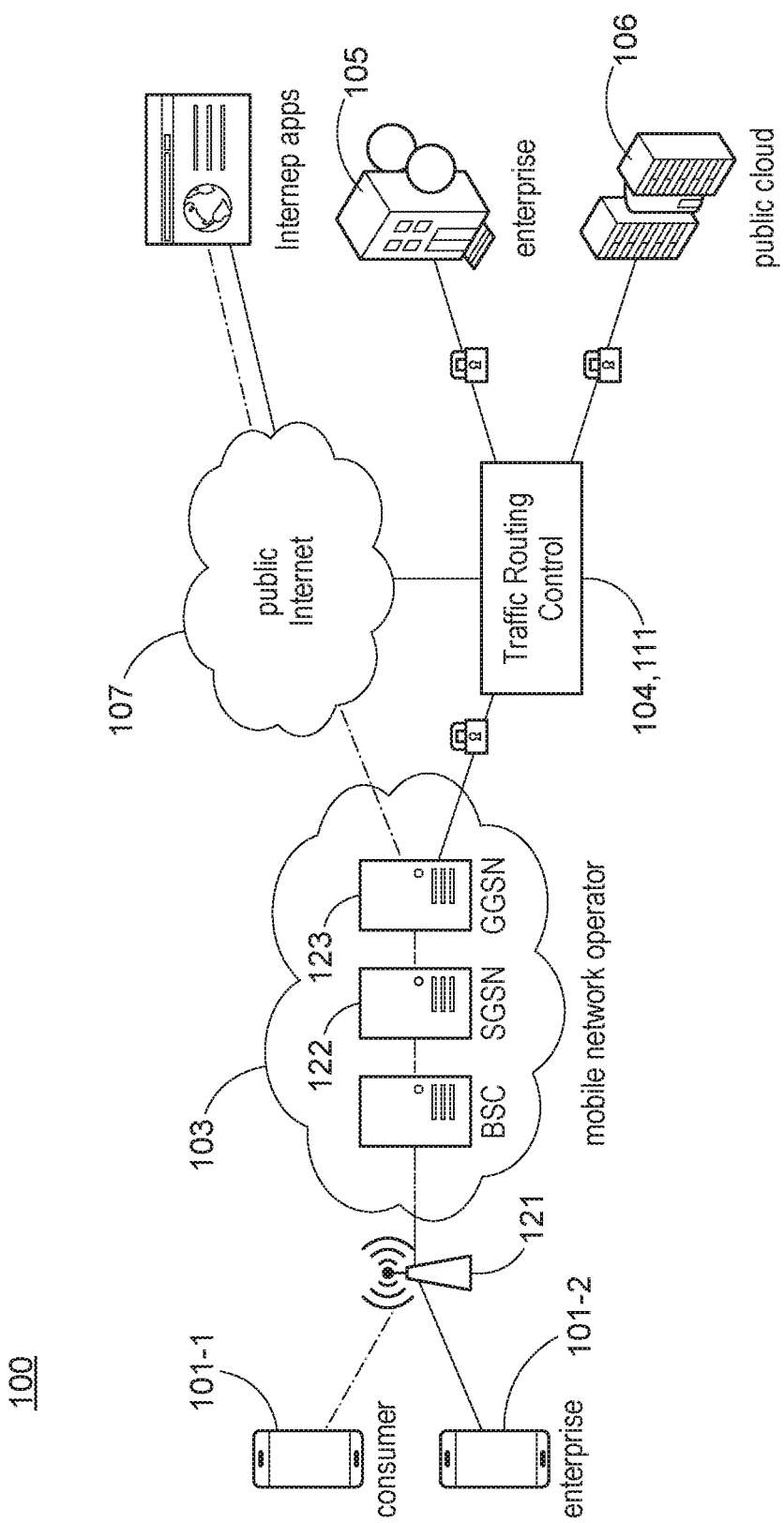
FIG. 2 is a schematic diagram showing just the elements of the telecommunications system of FIGS. 1A and 1B.

FIGS. 1A and 1B depict a schematic functional diagram of telecommunication system 100, in accordance with the illustrative embodiment of the present disclosure. (FIG. 2 depicts a less-detailed view, which shows just the elements of telecommunications system 100.) System 100 comprises one or more telecommunication endpoints 101-1 and 101-2, mobile network operator (MNO) network 103, service device 104, one or more enterprise systems 105-1 and 105-2, one or more cloud platforms 106-1 and 106-2, public Internet 107, and the managed service cloud platform 111, interconnected as shown.

Each telecommunication endpoint 101-1, 101-2 is a user device that enables its user (e.g., human, machine, etc.) to telecommunicate with other endpoints, and/or with other resources within telecommunications system 100. Each telecommunication endpoint 101-1, 101-2 can be mobile or immobile on the origination side as shown in FIGS. 1A and 2, and on the destination side (not shown). A telecommunication endpoint 101-1, 101-2 can be a wireless terminal, a cellular telephone or cellphone, a wireless transmit/receive unit (WTRU), a user equipment (UE), a mobile station, a fixed or mobile subscribed unit, a pager, a personal digital assistant (PDA), a smartphone, a tablet, a phablet, a smart watch, a (hands-free) wearable device, a desk set, a computer, or any other type of end-user device capable of operating in a telecommunication environment, for example and without limitation.

Each telecommunication endpoint 101-1, 101-2 is capable of providing access to its user via at least one network, in this case MNO network 103. In accordance with the illustrative embodiment, each telecommunication endpoint 101-1, 101-2 is capable of communicating via a cellular access network within MNO network 103. In some embodiments of the present disclosure, each telecommunication endpoint 101-1, 101-2 is capable of communication via a local area network (LAN) (e.g., in accordance with the WiFi standard, etc.). In some alternative embodiments of the present disclosure, each telecommunication endpoint 101-1, 101-2 is capable of communicating in accordance with one or more other standards such as the following telecommunications standards, without limitation: Global System for Mobile Communications (GSM), Universal Mobile Telecommunications System (UMTS), Long Term Evolution (LTE), CDMA-2000, IS-136 TDMA, IS-95 CDMA, 3G Wideband CDMA, IEEE 802.16 WiMax, Bluetooth, LoRa, and so on.

Each telecommunication endpoint 101-1, 101-2 is capable of storing and executing one or more software applications or "apps". For example and without limitation, a video display app enables the endpoint, and thus its user, to view one or more images that constitute a video stream. In addition, such an app enables the endpoint's user to mark one or more of the displayed images via a touch screen, as described below.

Mobile network operator infrastructure 103 is a network that provides telecommunications access and connectivity to the depicted telecommunication endpoints 101-1, 101-2. Network 103 comprises radio access network (RAN) 121, Serving GPRS Support Node (SGSN) 122, and Gateway GPRS Support Node (GGSN) 123, interconnected as shown. GPRS stands for "General Packet Radio Service", as is known in the art. Alternatively, elements 122 and 123 can be a Serving Gateway (SGW) and a Packet Data Network Gateway (PGW), as are known in the art. Network 103 comprises computer- and/or telecommunications-networking devices, which can include gateways, routers, network bridges, switches, hubs, and repeaters, as well as other related devices. Network 103 is managed by one or more service providers or operators, and provides bandwidth for various telecommunication services and network access to the telecommunication endpoints.

Service device 104 comprises one or more server computers and is configured to provide access into a private network from MNO network 103.

Each enterprise system 105-1, 105-2 comprises a private wide-area network and supports one or more corporate offices and data center application and storage hosting.

Managed service cloud platform 111 comprises one or more server computers and is configured to perform at least some of the actions described below and in the figures. The salient components of the server computer that makes up platform 111 are described below and in FIG. 3.

Figure 3:
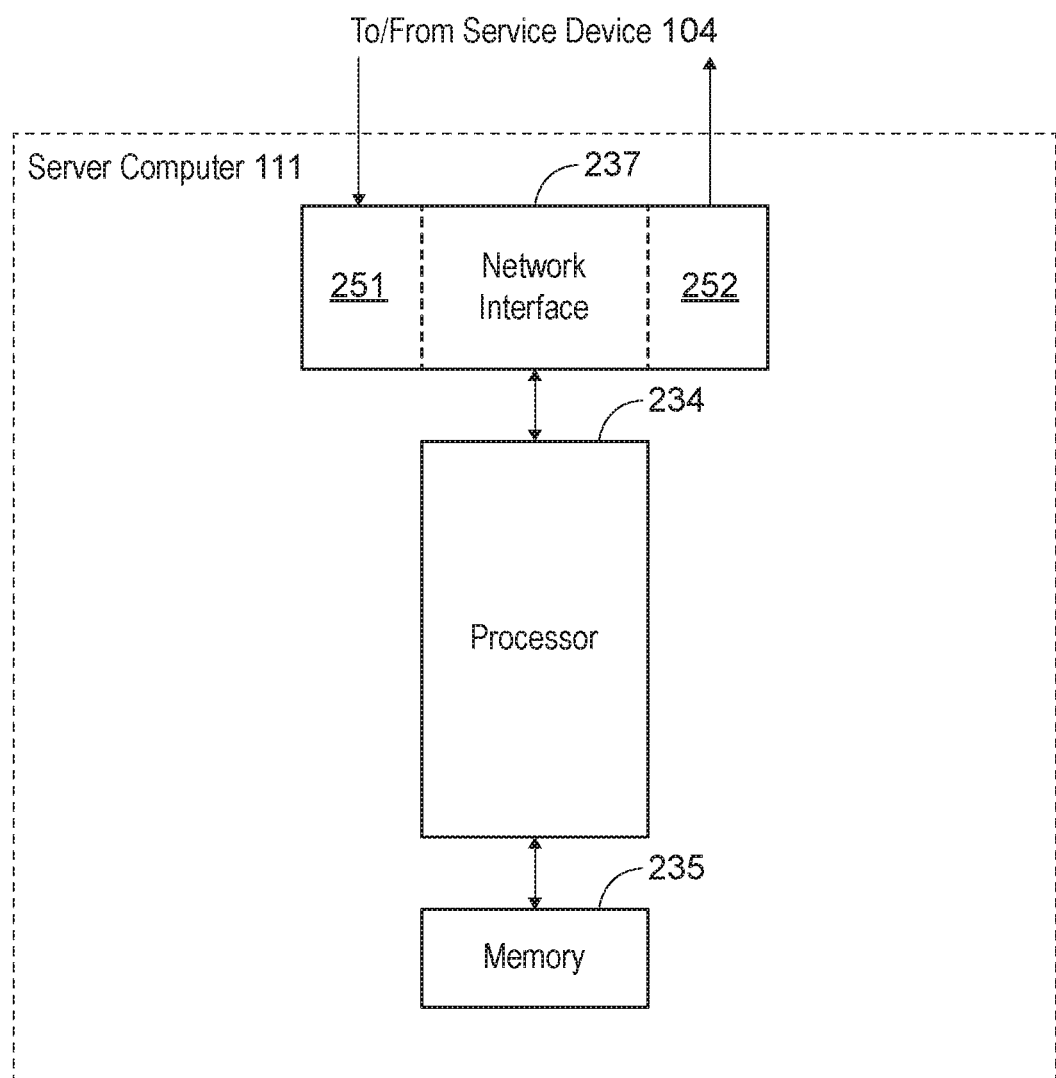
FIG. 3 is a block diagram of a server computer that forms a managed service cloud platform according to an illustrative embodiment of the present disclosure.

FIG. 3 depicts the salient components of a server computer that makes up managed service cloud platform 111 according to the illustrative embodiment of the present disclosure. The server computer is based on a data-processing apparatus whose hardware platform comprises: processor 234, memory 235, and network interface 237, interconnected as shown.

Processor 234 is hardware or hardware and software that performs mathematical and/or logical operations, such as a microprocessor as is known in the art. Processor 234 is configured such that, when operating in conjunction with the other components of the server computer, the processor executes software, processes data, and telecommunicates according to the operations described herein. Processor 234 can be one or more computational elements.

Computer memory 235 is non-transitory and non-volatile computer storage memory technology as is known in the art (e.g., flash memory, etc.). Memory 235 is configured to store an operating system, application software, and a database. The operating system is a collection of software that manages, in well-known fashion, the server computer's hardware resources and provides common services for computer programs, such as those that constitute the application software. The application software that is executed by processor 234 according to the illustrative embodiment enables the server computer to perform the functions disclosed herein. The database of the server computer of platform 111 is used to store, among other things, the policy database described below.

Network interface 237 is configured to enable the server computer to telecommunicate with other devices and systems, by receiving signals therefrom and/or transmitting signals thereto via receiver 251 and transmitter 252, respectively. For example, network interface 237 enables its server computer to communicate with one or more other devices. Network interface 237 communicates within a local area network (LAN) in accordance with a LAN protocol (e.g., WiFi, etc.) or within a cellular network in accordance with a cellular protocol, or both. In some other embodiments, network interface 237 communicates via one or more other radio telecommunications protocols or via a wireline protocol.

Receiver 251 is a component that enables the server computer to telecommunicate with other components and systems by receiving signals that convey information therefrom. It will be clear to those having ordinary skill in the art how to make and use alternative embodiments that comprise more than one receiver 251.

Transmitter 252 is a component that enables the server computer to telecommunicate with other components and systems by transmitting signals that convey information thereto. It will be clear to those having ordinary skill in the art how to make and use alternative embodiments that comprise more than one transmitter 252.

In some embodiments, service device 104 comprises one or more server computers such as the one described with respect to FIG. 3.

Pre-Requisite Setup with Service Device 104—FIGS. 1A and 1B, also depict the various actions described below. These operations include various sub-operations, which are indexed as circled numbers in the FIGS. 1A and 1B (e.g., "4-b", "1", "7-b", etc.).

As depicted in FIGS. 1A and 1B, the service device 104 of a private network, under the control of managed service cloud platform 111, performs one or more of the following:

A. Interconnect directly with participating Mobile Network Operators (e.g., MNO network 103) via a private network (e.g. via Multiprotocol Label Switching (MPLS), see: operation 4-b in FIGS. 1A and 1B). MNO 103 provisions a unique Access Point Name (APN) that is mapped to the interconnection point(s) and updated on each participating subscriber mobile device (e.g., telecommunication endpoint 101-1, telecommunication endpoint 101-2) (see: operation 1 in FIG. 1A).

B. Interconnect directly with the subscriber organization's wide-area network (WAN) (e.g., enterprise 105-1, 105-2) via a private network (e.g. via MPLS, see: operation 7-b in FIG. 1B) where the subscribers' private applications or data are being hosted in a data center or on a cloud service provider's platform (e.g., cloud platform 106-1).

C. Interconnect directly with participating cloud service provider platforms (e.g., cloud platform 106-2) via a private network (e.g. MPLS, see: operation 7-b in FIG. 1B) on which subscribers' organizations' applications or data are being hosted.

D. Establish public Internet connectivity via Internet Protocol (IP) transit or similar service provided by a telecom provider. (see: operation 7-a in FIG. 1B)

The interconnected MNOs makes available the unique Access Point Name (APN) that is tagged to each organization's user/subscriber/enrolled mobile device. This device-level APN is then used to allow all the subscribed devices Internet-bound mobile/cellular data traffic to be identified by the MNO and passed to the private interconnection point(s) of the illustrative embodiment, as opposed to their "default" IP (Internet) interconnection point(s). (see: operations 1-3 & 4-b in FIGS. 1A and 1B) Notably, this by itself—and without the benefit of the inventive solution logic described below—is similar to some approaches in the prior art (e.g., a private network approach using a different public URL being allocated to each different Blackberry™ device).

Solution Logic—

The processing logic of the illustrative embodiment is now described. The software based network policy platform on managed service cloud platform 111 of the illustrative embodiment dynamically determines the path of the traffic based on the destination network IP address that can either be private or public and belonging to any one of the multiple organizations registered. The rules applied are as follows:

a. If the subscribed device identifier & the organization's destination IP address are not registered in a policy database of the managed service cloud platform 111 of the illustrative embodiment, then the subscriber or the owner of the subscribed device, at telecommunications endpoint 101-1, 101-2 associated with the subscribed device identifier is prompted or notified to register the endpoint (see: operation 6 in FIG. 1B). The subscribed device identifier can be assigned by MNO 103, as long as it uniquely identifies the subscribed device/endpoint. As explained earlier, the SGSN (or SGW) and GGSN (or PGW) do have access to a unique identifier of the originating endpoint, even though the unique identifier is not used by devices in the public Internet, nor is it accessible to those devices. Once the subscribed device/endpoint is registered, the determination is made by the policy engine to keep the traffic on the private network or route the traffic to the public Internet based on the destination IP address (as per points b & c below) in each data packet subsequently received. The MNO already has access to the unique identifier of the subscribed device/endpoint, so this can be used, for security purposes, to authenticate the subscribed device/endpoint when registering.

b. If the subscribed device identifier and the destination network IP address of the organization are registered in the policy database (the organization registers their destination network IP address or their destination network IP address range of their private network along with their DNS database for their private network when the organization subscribes to the service implementing the method and system of the present disclosure), then the data remains on the private network and routed to the matching organization's private WAN (i.e., wide-area network that has its own private IP addressing) or cloud service provider platform. (See: operation 7-b in FIG. 1B). Notably, two different subscribed devices having two different subscribed device identifiers can be permitted to access the same private network (i.e., within the same organization of a given, private destination IP address). In some embodiments, the subscribed device identifier in each received data packet is checked in order to determine whether the subscribed device has permission to access the private network that corresponds to a private destination IP address in the received packet.

c. If the subscribed device identifier is registered in the policy database & the destination IP address is not registered, then the traffic is routed via the IP transit (Internet) connection of the illustrative embodiment. (See: operation 7-a in FIG. 1B).

With this architecture, the system of the illustrative embodiment is then able to provide customers with the unique capability for managing the mobile devices that are accessing their organization's network without the use of an on-device application. Examples of the management features are:

a. Time of day/day of week/calendar date blacklisted public websites or destination IP addresses based on content rating or direct url/destination IP address.

b. The application of QoS or CoS rules to their mobile data traffic (i.e., see https://en.wikipedia.org/wiki/Class_of_service).

The system of the illustrative embodiment is also able to provide its customers with the unique capability for malware, intrusion and/or fraud management capabilities as it relates to a mobile device accessing their organization's network without the use of an on-device application. Examples of these capabilities are:

a. Blocking of all "known" malicious website bound traffic based on the destination IP address.

b. Detecting, alerting and/or blocking potential Distributed Denial of Service (DDoS) attacks being perpetrated with the mobile device.

c. Detecting, alerting and/or blocking potential brute-force attacks for trying to compromise an organization's system being perpetrated by the mobile device.

d. Detecting, alerting and/or blacklisting devices based on suspicious activities determined through a heuristic process or method based on the historical mobile data traffic patterns.

In addition, the system of the illustrative embodiment also provides data analytics capabilities based on the mobile data traffic paths. Examples are:

a. Internet & Intranet based Services being accessed by hour/day/week/month, etc. at the organization level or across the overall customer base.

b. Performance analytics for cloud-based or content driven applications.

c. Provide mobile traffic metadata services through application programming interfaces (APIs) to interested organizations (such as marketers) based on the collection and aggregation of the mobile data traffic paths/service access across the customer base.

Figure 4:
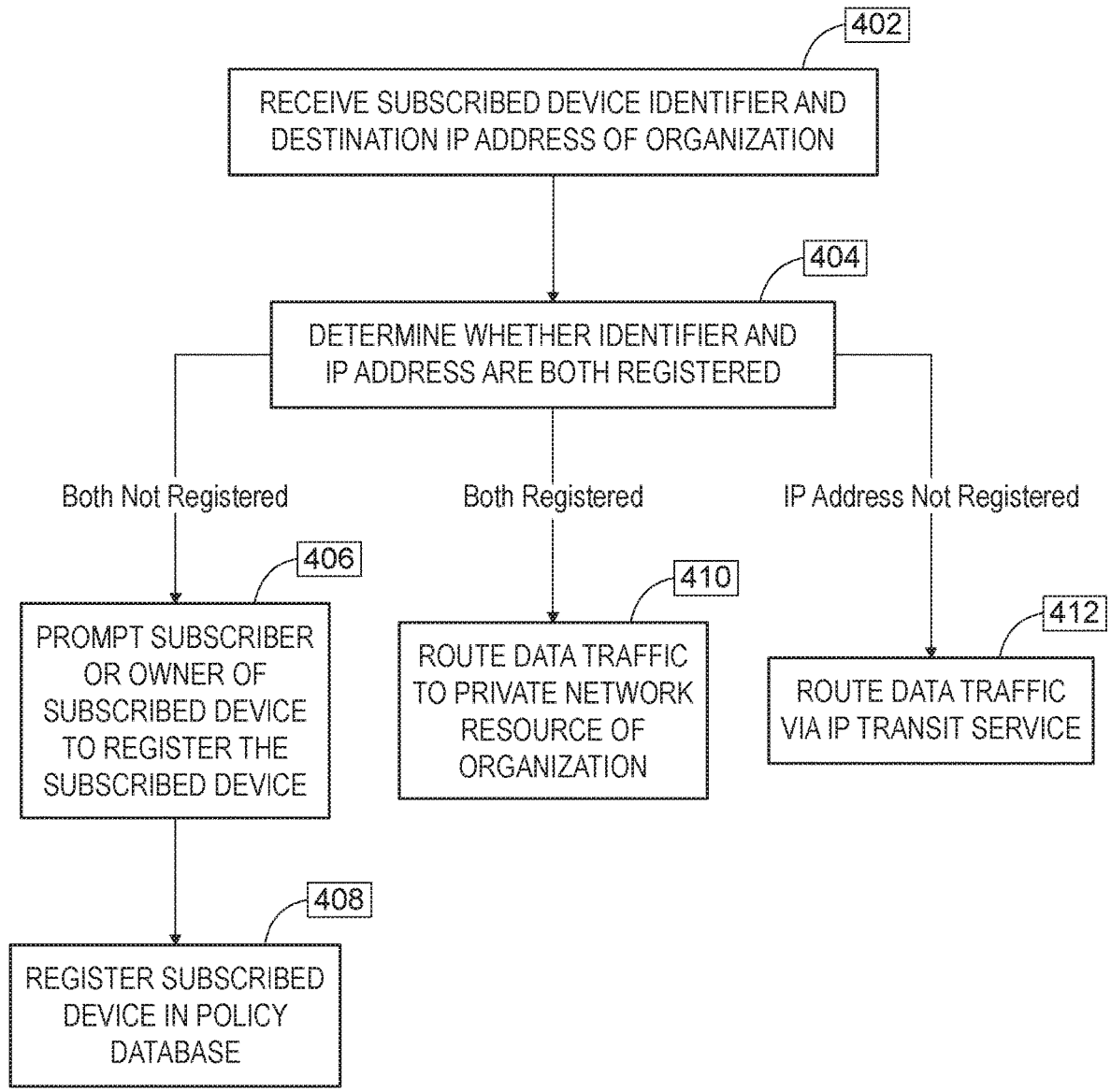
FIG. 4 is flowchart of a method for determining a path of data traffic based on a destination network IP address of an organization according to an illustrative embodiment of the present disclosure.

FIG. 4 is flowchart of a method for determining a path of data traffic based on a destination network IP address of an organization according to an illustrative embodiment of the present disclosure. In accordance with operation 402, a subscribed device identifier and the destination IP address of one of the multiple organizations is received at a managed service cloud platform. In accordance with operation 404, the managed service cloud platform determines whether both the subscribed device identifier and the destination IP address of the one of the multiple organizations are registered in a predetermined policy database of the managed service cloud platform. If the manage service cloud platform determines in operation 404 that both the subscribed device identifier and the destination IP address of the one of the multiple organizations are not registered in a predetermined policy database, the managed service platform prompts a subscriber or an owner of the subscribed device, at a telecommunications endpoint associated with the subscribed device identifier, to register the endpoint in accordance with operation 406. Then, in accordance with operation 408, the subscribed device identifier is registered in the predetermined policy database, based on information received from the telecommunications endpoint in response to the prompting.

If the managed service cloud platform determines in operation 404 that the subscribed device identifier and the destination IP address of the one of the multiple organizations are registered in the predetermined policy database, a service device of the managed service cloud platform on a private network routes the data traffic to a private network resource of the one of the multiple organizations in accordance with operation 410.

If the managed service cloud platform determines in operation 404 that the subscribed device identifier is registered in the policy database and the destination IP address of the one of the multiple organizations is not registered in the predetermined policy database, the service device of the managed service cloud platform on the private network routes the data traffic via an IP transit service to the public internet in accordance with operation 412.

It should be understood that the invention is not limited to the embodiments illustrated and described herein. Rather, the appended claims should be construed broadly to include other variants and embodiments of the invention, which may be made by those skilled in the art without departing from the scope and range of equivalents of the invention. It is indeed intended that the scope of the invention should be determined by proper interpretation and construction of the appended claims and their legal equivalents, as understood by those of skill in the art relying upon the disclosure in this specification and the attached drawing.

What is claimed is:

1. A method for determining a path of data traffic based on a destination Internet Protocol (IP) address, the destination IP address being either private or public and belonging to any one of multiple organizations, the method comprising:
   receiving, at a managed service platform, a subscribed device identifier and the destination IP address of one of the multiple organizations;
   if both the subscribed device identifier and the destination IP address of the one of the multiple organizations are not registered in a predetermined policy database:
   a) prompting a subscriber or an owner of the subscribed device, at a telecommunications endpoint associated with the subscribed device identifier, to register the endpoint, and
   b) registering the subscribed device identifier in the predetermined policy database, based on information received from the telecommunications endpoint in response to the prompting;
   if the subscribed device identifier and the destination IP address of the one of the multiple organizations are registered in the predetermined policy database, routing, via a service device of the managed service platform on a private network, the data traffic to a private network resource of the one of the multiple organizations; and
   if the subscribed device identifier is registered in the policy database and the destination IP address of the one of the multiple organizations is not registered in the predetermined policy database, routing, via the service device of the managed service platform on the private network, the data traffic via an IP transit service to a public Internet.

2. The method of claim 1, further comprising, via the service device of the managed service platform on the private network, interconnecting directly with a mobile network operator (MNO) network, wherein the MNO network provisions a unique Access Point Name that is mapped to at least one interconnection point in the private network and is updated on each participating subscribed telecommunications endpoint.

3. The method of claim 2, wherein the interconnecting is performed, at least in part, via multiprotocol label switching.

4. The method of claim 1, wherein the private network resource is a wide-area network of the organization matching the destination IP address.

5. The method of claim of claim 4, further comprising interconnecting, via the service device of the managed service platform on the private network, directly with the wide-area network.

6. The method of claim 5, wherein the interconnecting is performed, at least in part, via multiprotocol label switching.

7. The method of claim 1, wherein the private network resource is a cloud service provider platform of the organization matching the destination IP address.

8. The method of claim 7, further comprising interconnecting, via the service device of the managed service platform on the private network, directly with the cloud service provider platform.

9. The method of claim 8, wherein the interconnecting is performed, at least in part, via multiprotocol label switching.

10. The method of claim 1, further comprising establishing, via the service device of the managed service platform on the private network, public Internet connectivity via the IP transit service.

11. The method of claim 1, wherein if the destination IP address is registered, further comprising blocking data traffic from a predetermined type of website or web service, routed to the destination IP address.

12. A system for determining a path of data traffic based on a destination IP address, the destination IP address being either private or public and belonging to any one of multiple organizations, the system comprising:
   (I) a managed service platform configured to:
      (a) receive a subscribed device identifier and the destination IP address of one of the multiple organizations, and
      (b) if both the subscribed device identifier and the destination IP address of the one of the multiple organizations are not registered in a predetermined policy database, perform actions of:
         (i) prompting a subscriber or an owner of the subscribed device, at a telecommunications endpoint associated with the subscribed device identifier, to register the endpoint, and
         (ii) registering the subscribed device identifier in the predetermined policy database, based on information received from the telecommunications endpoint in response to the prompting; and
   (II) a service device on a private network configured to:
      (a) if the subscribed device identifier and the destination IP address of the one of the multiple organizations are registered in the policy database, route the data traffic to a private network resource of the one of the organizations, and
      (b) if the subscribed device identifier is registered in the policy database and the destination IP address of the one of the organizations is not registered in the policy database, route the data traffic via an IP transit service to a public Internet.

13. The system of claim 12, wherein the service device on the private network is further configured to interconnect directly with a mobile network operator (MNO) network, wherein the MNO network provisions a unique Access Point Name that is mapped to at least one interconnection point in the private network and is updated on each participating subscribed telecommunications endpoint.

14. The system of claim 13, wherein the service device on the private network is configured to interconnect, at least in part, via multiprotocol label switching.

15. The system of claim 12, wherein the private network resource is a wide-area network of the organization matching the destination IP address.

16. The system of claim of claim 15, wherein the service device on the private network is further configured to interconnect directly with the wide-area network.

17. The system of claim 16, wherein the service device on the private network is configured to interconnect, at least in part, via multiprotocol label switching.

18. The system of claim 12, wherein the private network resource is a cloud service provider platform of the organization matching the destination IP address.

19. The system of claim 18, wherein the service device on the private network is further configured to interconnect directly with the cloud service provider platform.

20. The system of claim 19, wherein the service device on the private network is configured to interconnect, at least in part, via multiprotocol label switching.

21. The system claim 12, wherein the service device on the private network is further configured to establish public Internet connectivity via the IP transit service.

22. The system claim 12, wherein the service device on the private network is further configured to block data traffic from a predetermined type of website or web service routed to the destination IP address if the destination IP address is registered.

* * * * *